United States Patent [19]

Murty et al.

[11] 3,929,981

[45] Dec. 30, 1975

[54] METHOD FOR DETERMINING THYROID FUNCTION

[75] Inventors: Hari S. Murty, North Brunswick; Siva K. Gara, Old Bridge; Dasika R. Murty, North Brunswick, all of N.J.

[73] Assignee: E. R. Squibb & Sons, Inc., Princeton, N.J.

[22] Filed: Feb. 27, 1974

[21] Appl. No.: 446,179

[52] U.S. Cl.................... 424/1; 23/230 B; 250/303
[51] Int. Cl.$^2$...................... G01N 33/00; G01T 1/16
[58] Field of Search........ 23/230 B; 250/303; 424/1, 424/12

[56] References Cited
UNITED STATES PATENTS 3,414,383  12/1968  Murphy ............................... 23/230
3,714,344  1/1973  Brown..................................... 424/1
3,850,577  11/1974  Ashkar.............................. 23/230 B

*Primary Examiner*—Benjamin R. Padgett
*Assistant Examiner*—Christine M. Nucker
*Attorney, Agent, or Firm*—Lawrence S. Levinson; Merle J. Smith; Donald J. Barrack

[57] ABSTRACT

In an in vitro test for the determination of thyroxine using the competitive protein-binding technique, the improvement that comprises extracting the thyroxine into a lower alkanol or dioxane, but not separating the lower alkanol or dioxane solution of thyroxine from the serum prior to measurement of the thyroxine.

18 Claims, No Drawings

METHOD FOR DETERMINING THYROID FUNCTION

BACKGROUND OF THE INVENTION

Thyroid-function tests are an important tool in the diagnosis of thyroid disease and the study of its physiopathology. The measurement of the concentration of thyroxine (also known as T-4) in serum is one type of thyroid-function test. Thyroxine is a thyroid hormone produced in the thyroid gland and carried by the blood to the various body cells where it (along with other hormones) regulates the activity of the cells.

The patent and non-patent literature both report many methods for measuring thyroxine. These methods can be divided into two basic approaches: (1) separation of thyroxine from other iodinated components of serum, followed by analysis of the stable iodine content of the thyroxine and (2) separation of thyroxine from serum followed by measuring the ability of the separated thyroxine to displace radioisotope labelled thyroxine from thyroxinebinding globulin in a standard protein solution.

The first method involves separation of thyroxine from other iodinated components of a serum sample using techniques such as column or thin layer chromatography (see, for example, V. J. Pileggi et al., *J. Clin. Endocr.*, 21:1272 (1961) or C. D. West et al., *J. Clin. Endocr.*, 25:1189 (1965)) or by solvent partition (see, for example, U.S. Pat. No. 3,389,968). After separating the thyroxine from the other iodinated components in a serum sample the thyroxine can be analyzed by measuring its stable iodine content using procedures well known in the art.

The second approach to the measurement of thyroxine is based upon the protein-binding displacement principle described by R. P. Elkins, *Clin. Chim. Acta.*, 5:453 (1960) and the techniques developed by B. E. P. Murphy et al., *J. Clin. Endocr.*, 24:187 (1964) and U.S. Pat. No. 3,414,383. The thyroxine is separated from the serum sample (but not necessarily from the other iodinated materials in the serum) and then measured by its ability to compete with radioisotope labelled thyroxine for available binding sites on thyroxine-binding globulin in a standard protein solution. As far as is known, the iodinated components of the serum, other than thyroxine, do not interefere significantly with this reaction. The thyroxine-binding globulin cannot distinguish between labelled and unlabelled thyroxine, which therefore compete on an equal basis for available binding sites. Labelled and unlabelled thyroxine become bound to the thyroxine-binding globulin in the same ratio as they exist in the unbound state. Measurements can be made of (1) the labelled thyroxine that is bound to the thyroxine-binding globulin, (2) the labelled thyroxine that is not bound to the thyroxine-binding globulin or (3) both bound and free labelled thyroxine. A quantitative measurement of thyroxine in the serum sample is achieved by calibrating the binding of labelled thyroxine in the presence of known amounts of unlabelled thyroxine.

SUMMARY OF THE INVENTION

It is an object of this invention to provide a highly reproducible and accurate method for the specific measurement of thyroxine in serum.

It is a further object of this invention to provide an in vitro technique for measuring the amount of thyroxine in small aliquots of serum.

It is a further object of this invention to provide a method for measuring thyroxine in serum utilizing the competitive protein binding technique that eliminates the need for solvent removal following solvent extraction of thyroxine from serum.

It is a further object of this invention to provide a method for measuring thyroxine in serum that is within the capabilities of any hospital or office laboratory with ordinary isotope facilities and that is simple, rapid, and inexpensive enough to be used as a general screening procedure.

These, and other objects that will be readily apparent to a person of ordinary skill in the art, are accomplished using the method of this invention.

The process of this invention is an improvement of the "classical" serum thyroxine determination taught by B. E. P. Murphy et al., *J. Clin. Endocr.*, 24:187 (1964); B. E. P. Murphy, *J. Lab. J Clin. Med.*, 66(1):161 (1965); and B. E. P. Murphy, U.S. Pat. No. 3,414,383.

In the classical method the serum sample is treated with a lower alkanol to precipitate binding and non-binding proteins; the serum thyroxine goes into solution in the alcohol. After separating the precipitated proteins from the alcohol solution, the alcohol must be evaporated to drynes or diluted with more alcohol. Using well known competitive binding techinques, the thyroxine in the fraction isolated as described above is then measured.

More recently, J. L. Brown, U.S. Pat. No. 3,714,344, has disclosed a modification of the classical method whereby a serum sample is treated with a lower alkanol, the lower alkanol solution is then separated (following centrifugation) from the precipitated proteins, and the thyroxine in the lower alkanol solution is determined using competitive binding techniques (evaporation of the lower alkanol is omitted).

It has now been found that it is possible to simply extract the thyroxine from the serum using a lower alkanol or dioxane and then proceed directly to the measurement of thyroxine using competitive binding techniques. The process of this invention does not require centrifugation of the serum-alcohol or serum-dioxane mixture, separation of the alcohol or dioxane solution of thyroxine from precipitated proteins, evaporation of the alcohol or dioxane, or dilution of the alcohol or dioxane after the solvent extraction and prior to measurment of the thyroxine.

The method of this invention comprises:

i. treating a serum sample with a lower alkanol or dioxane;

ii. adding to the mixture of serum and alcohol or dioxane a known amount of a solution of thyroxine-binding globulin saturated with radioisotope labelled thyroxine, and mixing the solutions;

iii. separating the unbound thyroxine from the thyroxine that is bound to the thyroxine-binding globulin; and iv. measuring the radioactivity of the bound thyroxine fraction, the unbound thyroxine fraction, or of both fractions.

DETAILED DESCRIPTION OF THE INVENTION

The first step of the method of this invention is the separation of thyroxine from the serum sample. To do this, the binding ability of the binding proteins in the serum sample must be destroyed in order to free all the thyroxine in the sample. This is accomplished by mixing a lower alkanol or dioxane with the serum sample. The serum sample and the lower alkanol or dioxane are mixed in a volume ratio of serum to solvent of from 3:1 to 1:1, preferably from 2:1 to 1:1, and most preferably about 1.4:1. The preferred solvents are the lower alkanols having 1 to 4 carbon atoms; absolute ethanol is the most preferred. The mixture of serum and solvent is gently swirled to assure complete extraction of the thyroxine into the solvent.

After allowing the mixture to stand for at least about 5 minutes, a carefully measured amount of a solution of thyroxine-binding globulin saturated with radioisotope labelled thyroxine is added. The thyroxine can be labelled with any radioisotope, but I-125 and I-131 are preferred, I-125 being the most preferred. Preparation of a solution of thyroxine-binding globulin saturated with radioisotope labelled thyroxine is well known in the art; see for example, Dalrymple et al., *J. Lab. J Clin. Med.*, 75(2):325 (1970) and Burger et al., *Acta Endocrinologica*, 68:431 (1971). The mixture is mixed gently prior to separation of the bound thyroxine from the unbound thyroxine.

Separation of the bound from the unbound thyroxine is accomplished by adding an adsorbent material to the mixture of serum, alcohol, and thyroxine-binding globulin to adsorb the unbound thyroxine. The adsorbent material is then separated from the mixture, e.g., by centrifugation followed by decantation. It will be readily apparent to a person of ordinary skill in the art that a wide variety of adsorbents can be used in the process of this invention. For example, adsorption can be accomplished using uncoated charcoal or charcoal coated with a material that will act as a molecular sieve; see V. Herbert, U.S. Pat. No. 3,442,819. Particulate inorganic crystalline materials are also useful as adsorbents; see A. M. Eisentraut, U.S. Pat. No. 3,666,854. The preferred adsorbent material for use in the process of this invention is an ion-exchange material. Various ion exchangers are disclosed for use as adsorbents in this art; see, for example, U.S. Pat. Nos. 3,414,383, 3,507,618, 3,516,794, and 3,714,344. Particularly preferred are anion exchange materials prepared from cellulose such as Ecteola-cellulose (see Peterson et al., *J. Am. Chem. Soc.*, 78:751 (1956)). Also useful are anion exchange resins having strongly basic amino or quaternary ammonium groups. The physical form of any adsorbent used is not critical; powders, tablets, strips, etc., are all useful.

Measurement of the radioactivity of either the unbound thyroxine (i.e., the thyroxine adsorbed on the adsorbent) or the bound thyroxine, or both is made. By running the above described analysis on samples containing known concentrations of thyroxine, a standard curve (concentration vs. either unbound thyroxine or thyroxine bound to thyroxine-binding globulin) can be prepared. The concentration of thyroxine in the unknown sample can be read from the standard curve.

The following procedure further illustrates this invention.

Assay Procedure

1. Pipette 100 $\mu$l of clinical sample into each of two test tubes.

2. Add 70 $\mu$l of absolute ethanol to each of the two test tubes, gently swirl each tube and allow them to stand for at least 5 minutes.

3. Add 2.0 ml of the solution of thyroxine-binding globulin saturated with radioisotope labelled thyroxine to each tube and to each of ten additional tubes numbered 1 through 10. Mix the tubes containing the clinical samples gently.

4. Pipette 50 $\mu$l of the Thyroxine Standard Solution (the Thyroxine Standard Solution is a solution containing a known weight of thyroxine per volume of solution. Conveniently, a solution is prepared whereby 50 $\mu$l of solution contains 6 $\mu$g of thyroxine) to the tubes numbered 5 and 6. Pipette 100 $\mu$l of the Thyroxine Standard Solution to the tubes numbered 7 and 8. Pipette 150 $\mu$l of the Thyroxine Standard Solution to the tubes numbered 9 and 10.

5. Gently vortex tubes 5 through 10 and the tubes containing the clinical sample. Allow the tubes to stand at room temperature for at least 5 minutes.

6. Add adsorbent to each of the tubes containing the clinical sample and to tubes 3 through 10 and vortex or shake vigorously for 10 seconds.

7. Centrifuge the tubes containing adsorbent at 2,000–3,000 rpm for 2–3 minutes to tightly pack the adsorbent.

8. Pour off and discard the supernatant.

9. Measure the radioactivity remaining on the adsorbent (adsorbent counts). Measure the radioactivity in tubes 1 and 2 (total counts).

10. Using the following formula calculate the percent uptake of thyroxine:

$$\% \text{ uptake} = \frac{\text{adsorbent counts (net cpm)}}{\text{total counts (net cpm)}} \times 100$$

11. Prepare a standard curve by plotting the percent uptake against the quantity of thyroxine ($\mu$g/100 ml) added to the respective tubes. There are two tubes for each quantity and the average percent uptake should be used.

12. Determine the quantity of thyroxine in the clinical sample by referring to the standard curve prepared above.

The following examples futher illustrate this invention, and also compare the results obtained using the process of this invention with results obtained using commercially available tests.

EXAMPLE 1

The thyroxine content of several serum samples is measured using

1. Thyrostat-4 Diagnostic Test Kit, E. R. Squibb and Sons, Inc., Princeton, N.J. (referred to in Table 1 as "Squibb");
2. Tetrasorb-125, Abbott Laboratories, North Chicago, Ill. (referred to in Table 1 as "Abbott"); and
3. the assay procedure of this invention as set forth above (referred to in Table 1 as "Direct Method").

In the following table serum samples A-F are from pregnant patients, samples G-K are from hyperthyroid patients, and samples L-R are from normal patients.

Table 1

| Serum Sample | Thyroxine Concentration (µg/100ml) | | |
|---|---|---|---|
| | Squibb | Abbott | Direct Method |
| A | 11.2 | 12.4 | 12.0 |
| B | 13.4 | 13.2 | 13.0 |
| C | 12.1 | 12.8 | 13.0 |
| D | 12.8 | 13.0 | 11.6 |
| E | 13.3 | — | 12.0 |
| F | 9.5 | — | 9.6 |
| G | >18 | 18 | 18 |
| H | 18 | — | 16.3 |
| I | 18 | — | 14.0 |
| J | 16.8 | 17.2 | 16.4 |
| K | 14.6 | 15.4 | 15.2 |
| L | 8.1 | 8.0 | 7.7 |
| M | 7.4 | 7.8 | 7.7 |
| N | 10.5 | — | 9.2 |
| O | 8.3 | — | 8.4 |
| P | 9.6 | 7.5 | 9.4 |
| Q | 5.5 | — | 7.5 |
| R | 8.0 | — | 10.0 |

EXAMPLE 2

The thyroxine content of several serum samples from hypothyroid patients is measured using 1) Thyrostat-4 Diagnostic Test Kit, E. R. Squibb and Sons, Inc., Princeton, N.J. (referred to in Table 2 as "Squibb") and 2) the assay procedure of this invention as set forth above (referred to in Table 2 as "Direct Method").

Table 2

| Serum Sample | Thyroxine Concentration µg/100ml | |
|---|---|---|
| | Squibb | Direct Method |
| S | 1.30 | 2.10 |
| T | 1.30 | 3.40 |
| U | 1.25 | 1.25 |
| V | 1.30 | 1.20 |
| W | 3.40 | 3.90 |

EXAMPLE 3

In order to measure the accuracy and specificity of the thyroxine determination of this invention the concentration of thyroxine in pooled normal serum is first determined. Various amounts of thyroxine are then added to the pooled normal serum and the concentration of thyroxine is again measured. Table 3 presents the results of this procedure.

Table 3

| Measured Endogenous (µg/100ml) | Recovery Efficiency Pooled Normal Serum | | | |
|---|---|---|---|---|
| | Exogenous Added (µg/100ml) | Predicted Total (µg/100ml) | Total Recovery (µg/100 ml) | Percent Recovery |
| 8.5 | 1.1 | 9.6 | 9.6 | 100 |
| 8.5 | 2.2 | 10.7 | 10.5 | 98 |
| 8.5 | 5.5 | 14.0 | 13.7 | 98 |

What is claimed is:

1. In a method of determining thyroxine in serum by the competitive protein-binding technique comprising extracting thyroxine from the serum with a lower alkanol or dioxane solvent; adding to the serum and solvent a solution of thyroxine-binding globulin saturated with radioisotope labelled thyroxine; separating thyroxine that is bound to the thyroxine-binding globulin from unbound thyroxine; and counting the bound thyroxine, the unbound thyroxine, or both bound and unbound thyroxine; the improvement wherein: the solvent extract is not separated from the serum prior to the addition of the solution of thyroxine-binding globulin saturated with radioisotope labelled thyroxine.

2. The process in accordance with claim 1 wherein the solvent is a lower alkanol.

3. The process in accordance with claim 2 wherein the solvent is ethanol.

4. The process in accordance with claim 1 wherein the solvent is dioxane.

5. The process in accordance with claim 1 wherein the volume ratio of serum to solvent is from 3:1 to 1:1.

6. The process in accordance with claim 1 wherein the volume ratio of serum to solvent is from 2:1 to 1:1.

7. The process in accordance with claim 1 wherein the volume ratio of serum to solvent is about 1.4:1.

8. The process in accordance with claim 1 wherein the thyroxine bound to the thyroxine-binding globulin is separated from the unbound thyroxine using an anion exchange material.

9. The process in accordance with claim 1 wherein the radioisotope labelled thyroxine is labelled with I-125.

10. The process for determining the thyroxine content of blood serum using the competitive protein-binding technique which comprises:
   i. extracting thyroxine from a serum sample by adding a lower alkanol or dioxane solvent to the serum;
   ii. adding a solution of thyroxine-binding globulin saturated with radioisotope labelled thyroxine to the mixture of serum and solvent;
   iii. separating the thyroxine that is bound to the thyroxine-binding globulin from the unbound thyroxine by adding an adsorbent to the mixture and separating the solid material from the liquid; and
   iv. measuring the radioactivity on the adsorbent, the radioactivity in the liquid, or both the radioactivity on the adsorbent and the radioactivity in the liquid.

11. The process in accordance with claim 10 wherein the solvent is a lower alkanol.

12. The process in accordance with claim 11 wherein the lower alkanol is ethanol.

13. The process in accordance with claim 10 wherein the solvent is dioxane.

14. The process in accordance with claim 10 wherein the adsorbent is an anion exchange material.

15. The process in accordance with claim 10 wherein the radioisotope labelled thyroxine is labelled with I-125.

16. The process in accordance with claim 10 wherein the volume ratio of serum to solvent is from 3:1 to 1:1.

17. The process in accordance with claim 10 wherein the volume ratio of serum to solvent is from 2:1 to 1:1.

18. The process in accordance with claim 10 wherein the volume ratio of serum to solvent is about 1.4:1.

* * * * *